United States Patent [19]

Heitmann

[11] Patent Number: 4,496,974
[45] Date of Patent: Jan. 29, 1985

[54] CONVERSION OF THE SCANNING LINE COUNT OF TELEVISION PICTURES

[75] Inventor: Jürgen Heitmann, Alsbach-Hähnlein, Fed. Rep. of Germany

[73] Assignee: Robert Bosch GmbH, Stuttgart, Fed. Rep. of Germany

[21] Appl. No.: 393,775

[22] Filed: Jun. 30, 1982

[30] Foreign Application Priority Data

Jul. 6, 1981 [DE] Fed. Rep. of Germany ....... 3126635

[51] Int. Cl.³ .............................................. H04N 5/02
[52] U.S. Cl. .................................... 358/140; 358/180; 343/5 SC
[58] Field of Search ............... 358/140, 139, 138, 137, 358/11, 180; 343/5 SC

[56] References Cited

U.S. PATENT DOCUMENTS

| Re. 31,460 | 12/1983 | Dalton et al. | 358/140 |
| 4,125,862 | 11/1978 | Catano | 358/140 |
| 4,271,476 | 6/1981 | Lotspiech | 358/140 |
| 4,310,907 | 6/1982 | Tachita et al. | 358/140 |
| 4,432,009 | 2/1984 | Reitmeier et al. | 358/140 |
| 4,449,143 | 5/1984 | Dischert et al. | 358/140 |

FOREIGN PATENT DOCUMENTS 2097219 10/1982 United Kingdom ................ 358/140

Primary Examiner—John C. Martin
Assistant Examiner—Edward L. Coles
Attorney, Agent, or Firm—Frishauf, Holtz, Goodman & Woodward

[57] ABSTRACT

Digitalized television signals of an entire picture field are stored and then are read out with a cross scanning of the lines of the picture field while the next picture field is stored in the memory in the memory cells vacated by cross scanning, thus in a different sequence of memory addresses. The cross scanned digital television signals are then subjected to low-pass filtering to provide output picture point signals at the rate of twice the filter cut-off frequency. If the picture format is to be changed, a sampling rate converter then restores the original sample rate and the digital signals are stored in a second picture field store from which a second cross read-out is made. Where no change of picture format is made the number of lines in the picture is changed in accordance with the setting of the filter cut-off and the related new sampling rate. When the picture format has been changed a vertically compressed picture bordered by black or a vertically expanded picture cut off at top or bottom or both is provided. In the latter two cases a second filtering and restoration of the sample rate is done to provide the same compression or expansion in the horizontal dimension of the picture.

11 Claims, 4 Drawing Figures

CONVERSION OF THE SCANNING LINE COUNT OF TELEVISION PICTURES

The invention concerns change of the number of lines per picture field of a digitalized television signal and involves a method and apparatus for providing for such conversion economically and with flexibility of control.

A method for converting a digitalized television signal having a first line scanning standard into a television signal conforming with a second line scanning standard is described in U.S. Pat. No. 4,051,531. In the system there disclosed the second line scanning standard can have either more lines or less lines than the first. A digital transversal filter with a chain of cascaded single line delay units is utilized. Between the succeeding delay units taps are provided at each of which a multiplication circuit is connected the outputs of which are connected together with an addition stage. At the respective other inputs of the multiplication circuits weighted coefficients are provided so that an interpolation of the input information may be possible. The output of the addition stages is connected to a storage circuit in which these interpolated values are stored with an intermediate line scanning standard. At the output of the storage circuit television signals of the second line scanning standard are available by read out only of the desired lines from the lines of the intermediate standard. That known method is highly complicated and expensive because of the extensive circuit and especially so for extreme changes of the line count of the picture as may necessary for picture format changes.

The invention.

It is an object of the present invention to provide a much simpler method and corresponding apparatus for conversion of the line count, particularly the picture field line count.

Briefly, each picture field is subjected to rotation by 90° by storing lines in one direction and then scanning at right angles thereto (i.e. across the lines with successive scans progressively shifted along the lines). and then rotated back by 90°, with processing of the signals in between by what is essentially low-pass filtering and re-timing in order to come out finally with a different line count. More particularly the method of the invention comprises the steps of writing the signals of a first picture field completely into a first picture field store in a first line direction, then, at the beginning of a second picture field, reading the signals of the first picture field out of the first picture field store in a second line scan direction perpendicular to the first one, filtering the first picture field signals, then writing them into a second picture field store in the aforesaid second line scan direction and then reading them out in the first line scan direction.

For a change of picture standard, the line scanning frequency of final read-out is made to conform with the new number of lines per picture. For a change of picture format (zoom effects), the line scanning frequency is not changed, but it is necessary to convert the new picture point succession rate at the filter output back to the original rate (sampling rate). The filtering step involves an output sampling rate equal to twice the cut-off frequency of the low-pass filter. In the case of a format change an additional filtering and sample rate reconversion step is needed for the format change in the horizontal direction, which may precede or follow the line count conversion.

The filter may be a digital filter or it may be an analog filter preceded by a digital-to-analog converter and followed by an anolog-to-digital converter. It is possible to carry out the operation with the same sample handling frequency for both picture field stores.

The invention has the advantage that with the repeated 90° rotation of coordinates substantially fewer and cheaper components can be utilized to produce the change in the scanning line count per picture field.

It is particularly advantageous when digital filters are used to replace the line period delay units necessary in the heretofore known methods of operation by the much more economical picture point interval delay units.

It is possible to economize on storage capacity by interchanging the directions of write-in and read-out of the stores for alternate picture fields, so that the places vacated by the read-out of one field at right angles to the direction of line scan used for storing it can be followed immediately by the storing of the next field in the same line scan direction at which the first field is being read out.

The drawings.

The invention is further described by way of illustrative examples with reference to the annexed drawings, which may serve as a symbolic summary of the apparatus aspect of the invention, and in which:

DESCRIPTION OF THE ILLUSTRATED EMBODIMENTS

Figure 1:
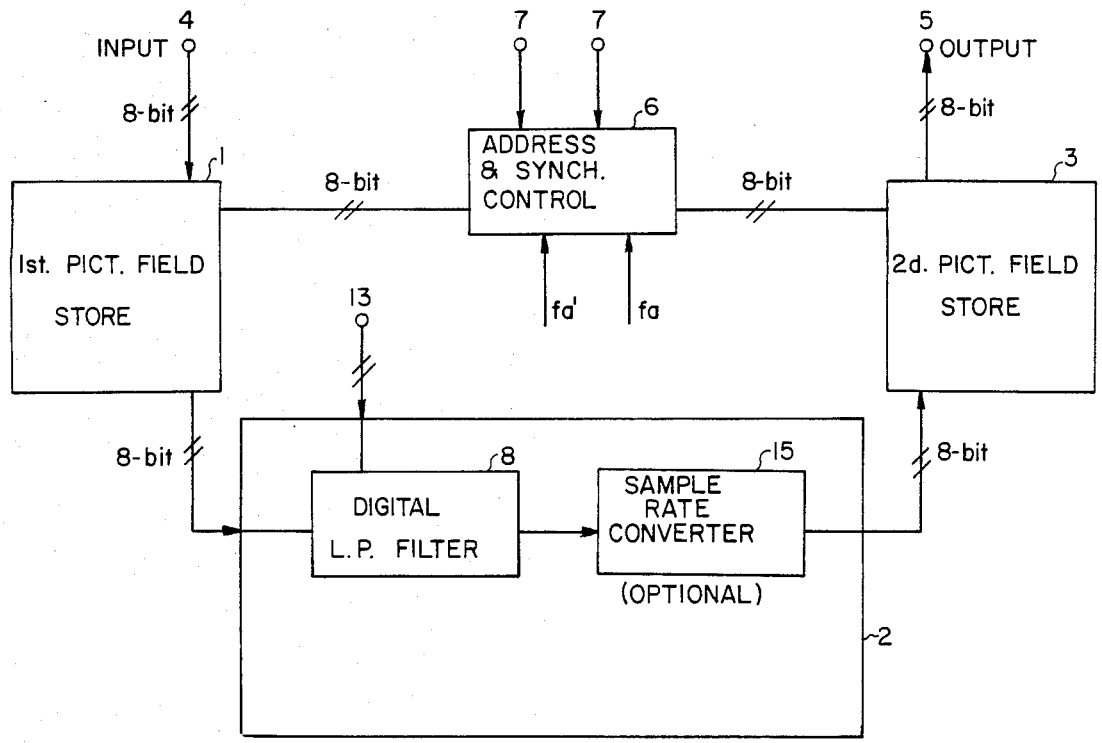
FIG. 1 is a block diagram of a first embodiment of apparatus according to the invention.

The main elements in all embodiments illustrated in the drawings are a first picture field store 1, a second picture field store 3 and a processing circuit 2 having a filtering and re-timing function interposed between the two stores.

The picture field stores are capable of storing an entire picture field which, in accordance with the present interlaced field system of television pictures, each involves half of the picture, being made up of alternate lines of the complete picture. The individual storage cells of the picture field stores are selectable by the provision of a row and column address as is usual in the case of random access memories (RAMs). The digitalized television signal, for example in 8-bit coded picture points, is supplied from the terminal 4 to the first picture field store 1 and is written into that store in a first direction, for example horizontally. After the complete write-in of a first picture field, the signal samples of this picture field are read out in a second line scanning direction at right angles to the first, thus vertically in the example already supposed. During the read-out operation the digitalized television signal of a following second picture field are simultaneously read into the storage cells vacated by the read-out of the signals of the first picture field, this being done in the same second direction of line scan (vertical in the example under consideration), so that both the write-in and the read-out direction of successive picture fields are alternately horizontal and vertical. The reading out of the second picture field then follows in the first direction, thus horizontal in the example under consideration, and so on.

Signals of the first picture field, after read-out from the first picture field store 1 are passed through the processing circuit 2 by which the conversion of the line count can be controlled and then written into the second picture store 3. In the latter the signals are now written the second line scan direction, the direction in which they were read out of the first picture store, thus vertically in the example under consideration. After they are fully written in they are read out in the first line scan direction, thus horizontally in the example under consideration. During the read-out of the second picture field store 3 there is performed at the same time, just as in the case of the first picture store 1, the writing in of the next picture field in the same direction, thus horizontally in the example under consideration, filling the storage cells as they become vacated. The read-out of this following picture field is then performed in the direction perpendicular to that in which the picture field is stored, thus vertically in the example under consideration. In consequence there appears at the terminal 5 a digitalized television signal which now has a changed line scan count because of the modification of the sampling rate under control of the processing circuit 2, which has modified the number of lines to be read out, which of course must be read out at a correspondingly modified line scanning frequency.

The addresses for both picture field stores 1 and 3 are derived in a known way in a control circuit 6, timed by the sampling rate signal of frequency $f_a$ and the television synchronizing signals provided in a known way to the terminal 7. When line count is changed without change of picture format the new sampling rate $f_a'$ and the new read-out scanning rate synch signals are provided respectively from the filter circuit 8 and from the terminal 7'.

Figure 2:
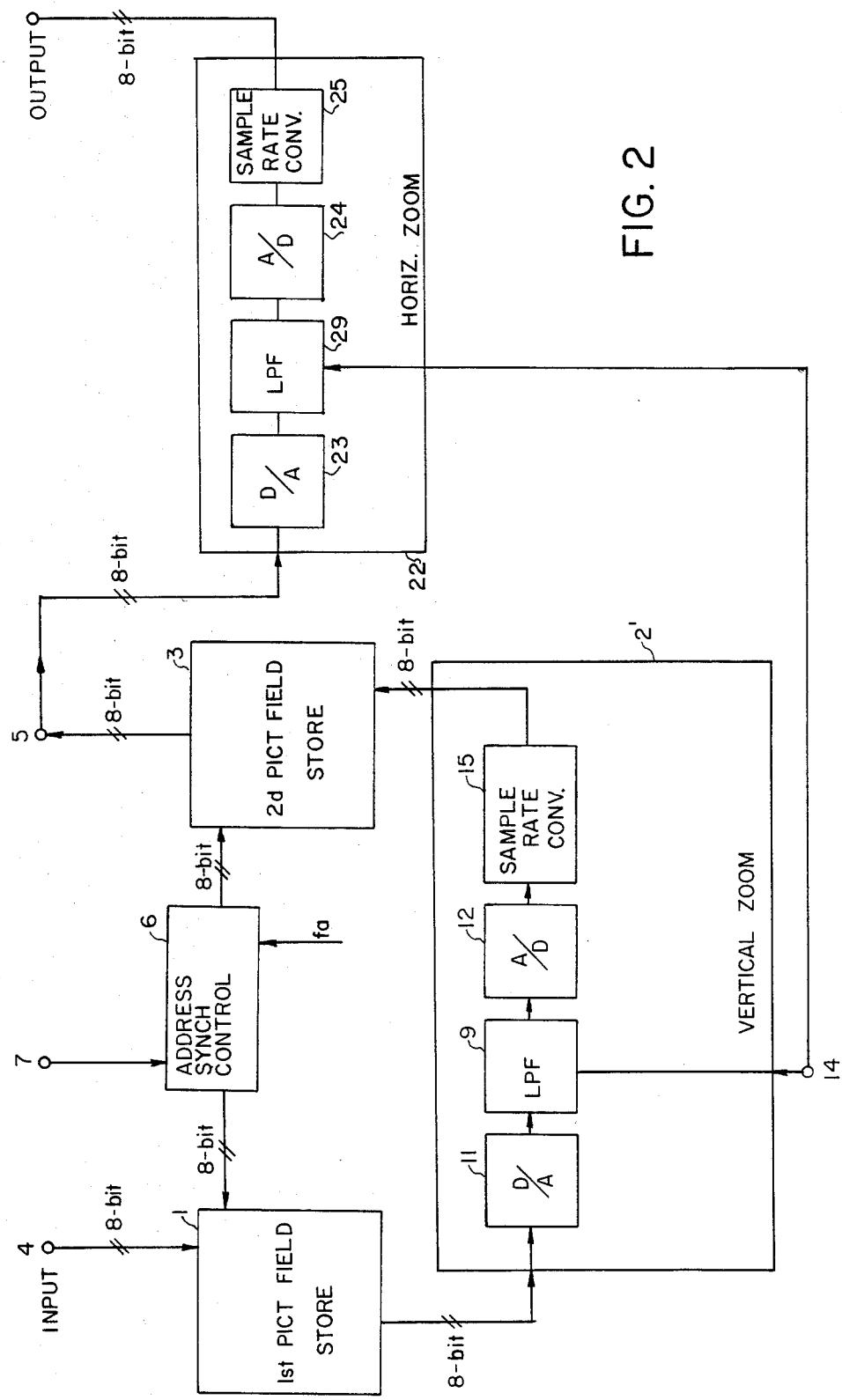
FIG. 2 is a block diagram of a second embodiment of apparatus according to the invention.
Figure 3:
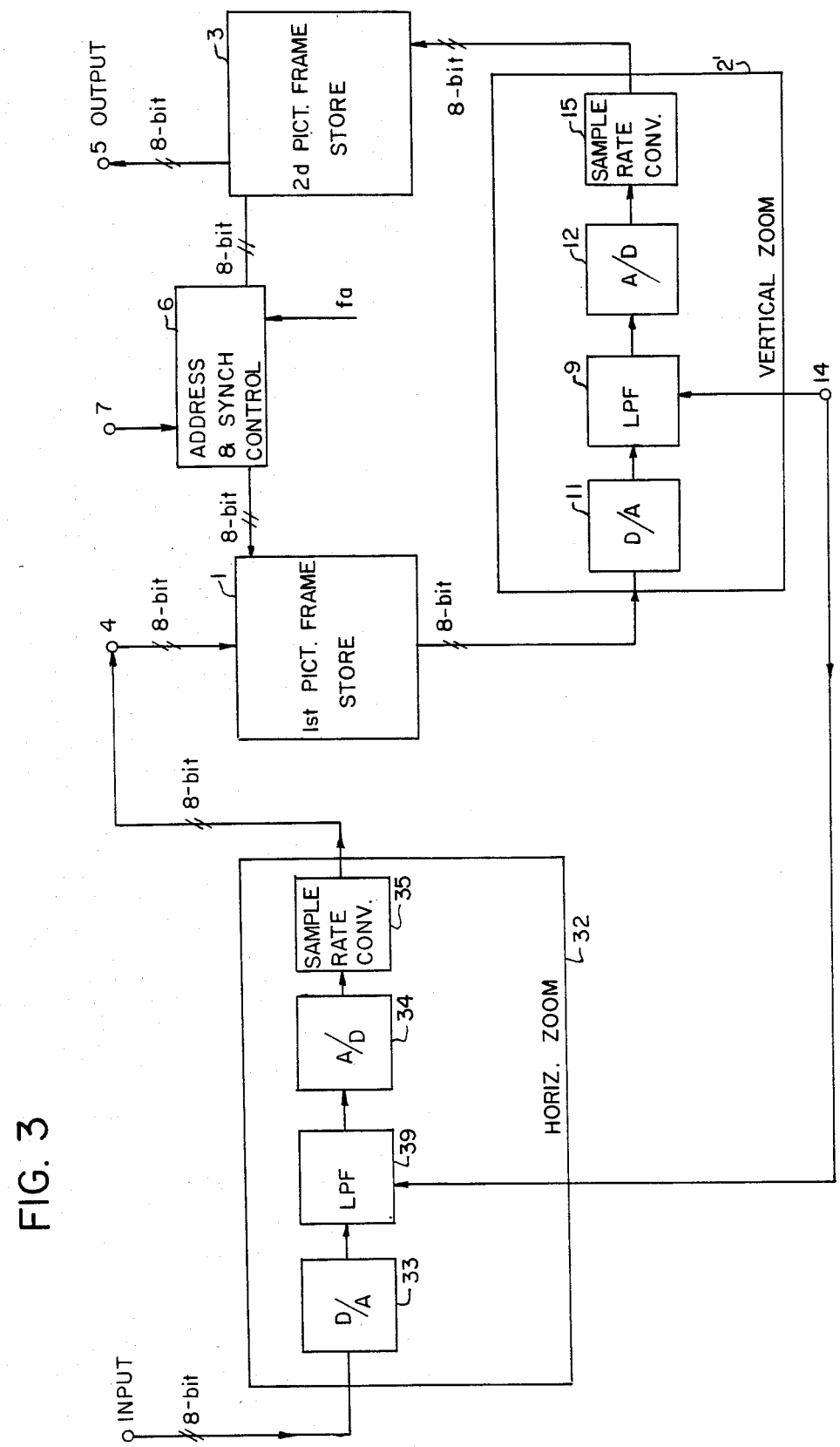
FIG. 3 is a block diagram of a third embodiment of apparatus according to the invention.

The processing circuit 2 in FIG. 1 contains a digital filter 8. In FIGS. 2 and 3, instead of the digital filter 8, there is provided an analog filter 9 of the well-known low-pass configuration which is preceded by a digital-to-analog converter 11 and followed by an analog-to-digital converter 12. The filter 8 or 9, as the case may be, can have either a fixed low-pass characteristic (for example for conversion from one television line scanning standard to another) or a variable low-pass characteristic (for example for zoom effect). A variable characteristic can be obtained for the digital filter 8 in a known way by control of variable coefficients applied to a terminal 13. In the case of the analog filter 9 of FIG. 2, variation of the cut-off frequency can be produced in a known way by a signal applied to the terminal 14. The low-pass characteristics of the filter in the processing circuit 2 produces an integration or interpolation of various sample values the successive ones of which belong to successive lines of the original pattern, so that the number of these sample values in each such scan across the original lines can be reduced or increased for reducing or increasing the number of picture lines in the reconstituted picture field. An Example of a digital low-pass filter has been described by L. Shapiro: "The design of digital filters" III, Electronic Engineering, October 1978, pp. 51–63.

If the purpose for the change in the number of picture lines per field is to conform to a different line scanning standard, so that more lines will be displayed per picture field, the line scanning rate of the read-out from the second picture field store 3 must be changed.

The different sampling rate at the filter output then is maintained, because of the changed number of points in the picture and the change in number of lines. If the purpose of the change in the number of lines is to provide a zoom effect, however, by displaying the same number of lines as before but by leaving out part of the picture originally in the format or by filling in black picture points around a shrunken picture, the sampling rate must be restored to the original sampling rate while the line scanning frequency for the read-out from the second memory 3 remains the same. The change in the sampling rate, if it is to be provided, is provided by the sampling rate converter 15 for restoring the original sampling rate. The sampling rate converter 15 can be constituted in a known way as a buffer store, for example a first-in-first-out (FIFO) buffer memory. The sampling rate of the input signal for the buffer store corresponds to twice the low-pass filter cut-off frequency. When the sampling rate is lowered, the buffer store establishes the original sampling rate of the picture signal by time compression of the signal. The signal gap resulting from time compression can be filled with a signal that corresponds to "picture black", as more fully shown in FIG. 4.

By the method of the invention at the same time a modification of the picture signal in the direction of original line scan, namely horizontal, can also be produced by providing another filter unit with outputs at twice the filter cut-off frequency followed by sampling rate reconversion, either before storing the picture field in the picture field store 1, or providing such a filter unit and sampling rate reconverter following the output of the second picture field store 3. The latter is illustrated in FIG. 2 by the processing unit 22 following the second picture field store 3, while the former is illustrated in FIG. 3 by the processing unit 32 preceding the first picture field store 1. As already mentioned FIGS. 2 and 3 show processing units 2' utilizing an analog low-pass filter 9 instead of the digital low-pass filter 8 of FIG. 1 and therefore, simply for conformity, the processing units 22 and 32 respectively utilize analog low-pass filters 29 and 39 and digital-to-analog and analog-to-digital converters 23, 24 and 33, 34 instead of a digital filter, but it is to be understood that digital filters could be used in these instead of the analog filter with its input and output converters. The processing units 22 and 32 also contain, like the processing unit 2', a sampling rate converter 25, 35, for changing back to the original sampling rate.

Figure 4:
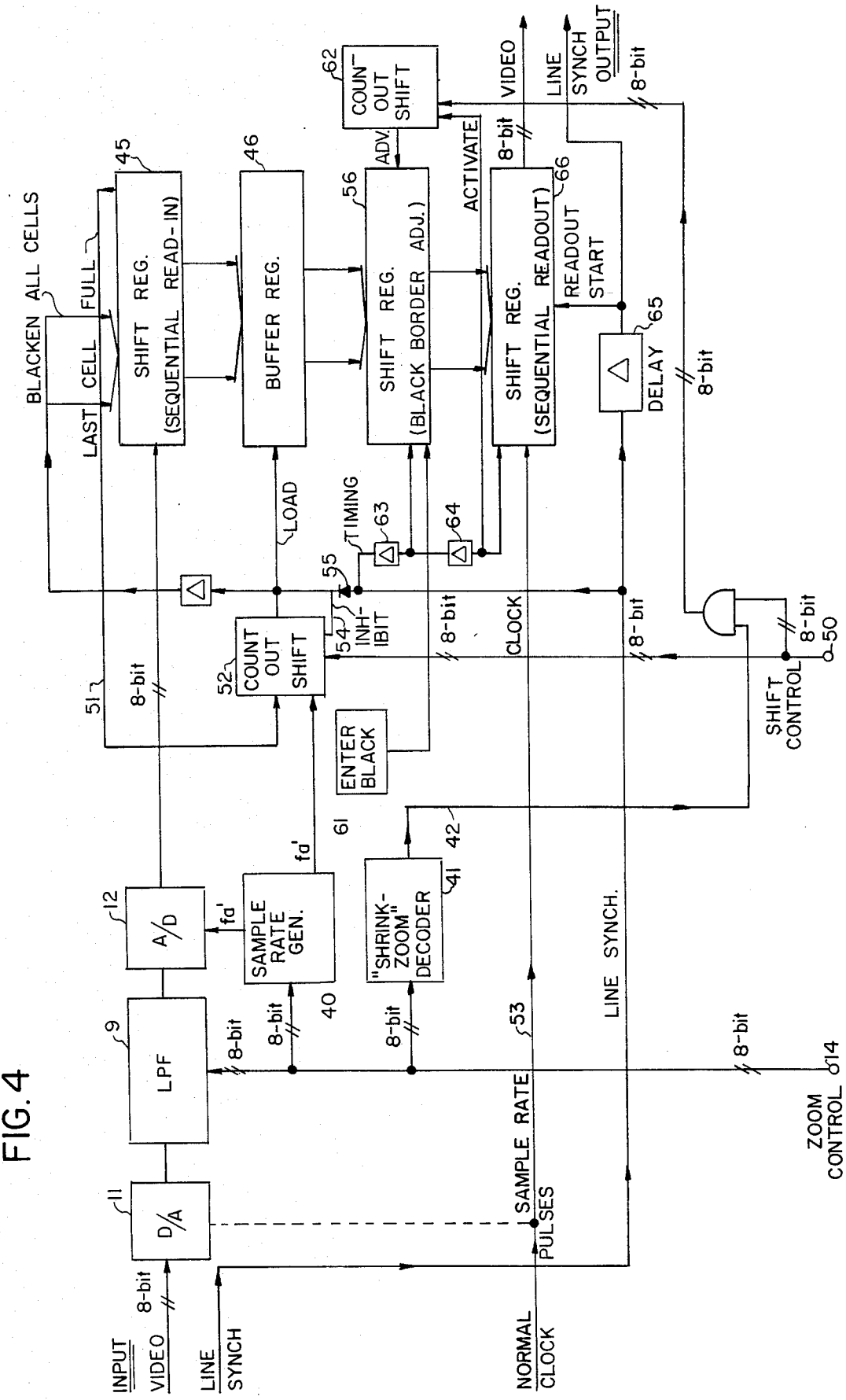
FIG. 4 is a more detailed diagram of the processing circuit used in FIGS. 3 and 4.

FIG. 4 will now be described in the context of FIG. 2, to illustrate the use of the invention for zoom effects.

The signal stored in the first picture store 1 may be assumed to be composed of n lines of n picture points each (assuming that the same resolution in each dimension is provided, and that a horizontal interlace is provided as well as a line interlace, which is readily provided in the case of digital television signals). Consequently, the signal read-out of the first picture field store 1 likewise consists of n lines of n picture points each, which makes it easy to write the next picture field in with lines running in the same direction as the read-out that is simultaneously going on. At the output of the analog-to-digital converter 12, there are now n lines of m picture points each, giving a different total of picture points per field.

FIG. 4 shows the processing unit 2' of FIG. 2 in more detail, mainly for the purpose of showing more fully the functions of the rate converter 15 which is constituted by the components in the right hand portion of FIG. 4. For the full understanding of this figure there are included some sample rate clock lines as well as well as synchronizing signal lines and delay units, not usually shown in block diagrams in order to keep the illustrations simple.

The digital-to-analog converter 10 receives 8-bit video samples at the normal rate. Although in the processing unit 2' the input video signals are made up of sequences of one picture point signal from each of the original television lines, since the line count in this example is the same as the count of picture points per line, the video signals may be regarded as a succession of television lines. In other words, the circuit of FIG. 4 applies not only to the processing unit 2' of FIG. 2 but also to the processing unit 22 which operates on the television lines proper. A zoom control signal is applied at the terminal 14 which at the same time determines the cut-off frequency of the filter 9 and sets the sampling rate for the analog-to-digital converter 12 at a value substantially equal to twice the cut-off frequency of the filter 9. In FIG. 4 this is shown by having the control signal from the terminal 14 applied both to the filter 9 and to a sample-clocking generator 40. Since the processing of successive lines to be read into the picture field store 3 is somewhat different for zooming up and zooming down respectively, a zoom factor sense decoder 41 is shown providing an output 42 when the picture is being shrunk, which is when the sample clocking generator 40 runs more slowly than the normal sample rate clock signal that corresponds to the rate at which picture point signals are provided to the digital-to-analog converter 10.

The 8-bit digital signals clocked out of the converter 12 by the sample clocking generator 40 proceed into the first shift register 45 of the sample rate converter 15 which is not specifically identified in FIG. 4. These signals advance into the shift register 45, which has n cells, just enough for one line. It will be assumed that the previous line has just been loaded into the buffer register 46, immediately after which all of the cells of the shift register 45 are loaded with black picture points in the manner to be described further below, in preparation for entry of a new line of video samples into the shift register 45. Thus, if the sampling rate of the converter 12 is slower than that of the converter 10, the cells of the shift register 45 that are not filled at the end of the processing of one line will be occupied by black picture points. On the other hand, if the analog-to-digital converter 12 has a sampling rate greater than that of the converter 10, the shift register will overflow before all of the m samples of the line have come out of the converter 12. Of course when the picture is expanded in a zoom operation some of it will be cut off and a shift control terminal 50 is provided to enable a shift of the portion of the line to be displayed. The shift in the case under discussion may be performed in various ways. The earliest that the buffer register 46 may be loaded will be when the right hand end cell of the shift register 45 is occupied by a video signal from the converter 12 as indicated on a conductor 51. The shift control 50 can provide a count digit to a delay counter 52 so as to allow the line to be shifted a few more steps through the shift register centering the picture, or even moving it over to the other side. After the last signal from the converter 12 gets into the shift register 45 the line synchronization signal on the conductor 53 will load the register 46 if it has not been loaded before. Of course once the buffer register 46 is loaded it must be immune from being reloaded until another line is ready to be loaded into it. For this purpose the counter 52 when it finishes its counts provides an inhibit pulse of suitable fixed duration on its inhibit output connection 54 to inhibit or gate out the next line synch pulse. The diode 55 is necessary to isolate the registers 56 and 66 from the effect of that inhibit pulse.

In the case the converter 12 is being clocked more slowly than the converter 10, the zoom control can produce a shift in a similar way, and in the illustrated case this is done with an additional shift register 56, although it could be done by providing pulses for further advancing the shift register 45 at the end of the line interval before register 46. In the illustrated case, in order not to interfere with quick succession of filling the shift register 45 line after line, the shift register 56 is provided, in which a counter 62 set by the shift control 50 advances the video signals the desired amount in the shift register 56 and at the same time inserts black picture points from the signal store 61 into the vacated cells. Once the buffer register 46 is loaded, after a short delay provided by the delay circuit 63, the shift register 56 is loaded and after another very slight delay provided by the delay means 64 the counter 62 is activated to provide the desired shift. A delay unit 65 longer than the aggregate of the delays 63 and 64 then loads the sequential read-out shift register 66 and starts the read-out which is clocked out at the normal sample rate by pulses provided over the line 53, which is the sample rate at which the digital-to-analog converter 10 operates. The read-out start pulse provided at the output of the delay unit 65 becomes the line synchronization pulses for subsequent stages, notably the second picture field store 3 (FIGS. 1, 2 and 3) to which the video signals stepped out of the register 66 now proceed, with n samples per line. These lines put into the picture store 3 will then be cross-scanned to produce a read-out of picture lines corresponding to the original horizontal scanning direction of the picture. This read-out from the picture store 3 will then provide a picture field signal relating to a picture field of n lines of n points, but leaving out m-n of the original lines when m is larger than n or adding n-m black lines (at top or bottom, or partly both) when m is small n. The picture has now been expanded or shrunk only in the horizontal dimension and for a normal zooming operation it should be expanded or shrunk to the same extent in the vertical direction. This is done by passing the signals through the processing circuit 22.

The processing circuit 22 operates exactly like the processing circuit 2' which has just been fully described in connection with FIG. 4. The same zoom control signal applied at the terminal 14 of FIG. 4 is applied at the terminal 74 of the processing unit 22 of FIG. 3. A separate shift control corresponding to the shift control 50 and not shown in FIG. 3 would of course be provided so that the vertical shift is not necessarily linked to the horizontal shift.

The operation of FIG. 3 is evidently comparable to that of FIG. 2, since it differs merely with the order in which the horizontal changes of format are made in reformatting the picture.

Although the invention has been described with reference to particular illustrative examples, it will be understood that variations and modifications are possibe with the inventive concept.

I claim:

1. Method of changing the number of lines per television picture for at least a portion of pictures represented by digitalized television signal comprising the steps of:

writing digital television signals of a first picture field of said signals completely into a first picture field store (1) in a first line scan direction;

at the beginning of a second picture field following said first picture field, reading the signals of said first picture field out of said first picture field store in a second line scan direction perpendicular to said first line scan direction;

filtering said signals of said first picture field by passing them through processing means (2) including a low-pass filter;

writing said filtered television signals into a second picture field store in a line scan direction corresponding to said second line scan direction (3), and reading the stored television signals out of said second picture field store in a line scan direction perpendicular to that in which said signals were written into said second picture field store and corresponding to said first line scan direction.

2. Method as defined in claim 1 wherein, in the step of reading television signals out of said first picture field store (1), the storage cells vacated thereby are promptly used for writing the signals of said following picture field into said first picture field store in said second line scan direction, corresponding to the line scan direction in which signals of said first picture field are being read out and similarly continuing the method with interchange of write-in and read-out line scan directions for alternate picture fields in the picture field sequence in the case of both said picture field stores.

3. Method as defined in claim 1 or claim 2 in which the filtering step is accomplished by passing the signals through processing means (2) comprising a digital low-pass filter (9) having the effect of changing the sampling rate of the television signal followed by a sampling rate converter (15), said digital filter (9) having a frequency characteristic adjustable by means of variable coefficients, said variable coefficients being adjusted to set the frequency cut-off of said digital filter (9) to correspond with substantially half a desired sampling frequency of the filter output signal, said sampling rate converter (15) being constituted to convert the changed sampling frequency of the output signal of said filter to the original value of the sampling rate.

4. Method as defined in claim 1 or claim 2 in which the filtering step is performed by passing the signals successively through a digital-to-analog converter (11), a low-pass filter (9), an analog-to-digital converter (12) and a sampling rate converter (15), said converters and filter constituting said processing means (2'), said analog low-pass filter (9) having an adjustable cut-off frequency, the sampling rate of the analog-to-digital converter (11) being substantially twice the cut-off frequency of said filter (9) and being different from the sampling rate of said digital-to-analog converter (11), said sampling rate converter (15) being constituted so as to reconvert the sampling rate frequency to the original value utilized in said digital-to-analog converter (11).

5. Method as defined in claim 3 in which both said first picture field store (1) and said second picture field store (3) are operated at the same signal sample handling frequency and at the same line scan frequency.

6. Method as defined in claim 4 in which both said first picture field store (1) and said second picture field store (3) are operated at the same signal sample handling frequency and at the same line scan frequency.

7. Method as defined in claim 1 or claim 2 in which the filtering step is accomplished by passing the signal through processing means (2) comprising a digital low-pass filter (9) having the effect of changing the sampling rate of the television signal and having a frequency characteristic adjustable by means of variable coefficients setting the frequency cut-off to correspond with substantially half the desired sampling rate of the filter output signal, and in which the read-out from said second picture field store is performed at a line scan frequency differing from the original line scan frequency in proportion to the change of the signal sampling rate appearing at the output of said digital filter (8).

8. Method as defined in claim 1 or claim 2 in which the filtering step is accomplished by passing the signals successively through a digital-to-analog converter (11), a low-pass filter (9), and an analog-to-digital converter (12), the sampling rate of said analog-to-digital converter (12) being substantially twice the cut-off frequency of said low-pass filter (9) and being different from that of said digital-to-analog converter and in which the read-out from said second picture field store is performed at a line scan frequency differing from the original line scan frequency in proportion to the change of the signal sampling rate appearing at the output of said analog-to-digital converter (12).

9. Method as defined in claim 3 including an additional step of changing the format of the television picture field in the horizontal direction as a preliminary or final step of the method by passing the television signals through processing means (22, 32) providing low-pass filtering and change of television signal sampling rate followed by reconversion of the sampling rate and thereafter passing said signal through format control means (36) for excluding excess portions of television lines and supplying picture black signals for lacking portions of television lines.

10. Method as defined in claim 4 including an additional step of changing the format of the television picture field in the horizontal direction as a preliminary or final step of the method by passing the television signals through processing means (22,32) providing low-pass filtering and change of television signal sampling rate followed by reconversion of the sampling rate and thereafter passing said signal through format control means (36) for excluding excess portions of television lines and supplying picture black signals for lacking portions of television lines.

11. Apparatus for changing the picture format of television signals comprising:

first means for storing digital television signals of a television picture field;

means for drawing said digital television signals out of said first picture field storage means in a cross-scanning pattern of addressing said first storage means so as to draw out the television signals in a sequence of individual picture points from consecutive lines repeated progressively from first to last points of the respective lines;

means for subjecting the signals drawn from said first storage means to low-pass filtering combined with change of sampling rate for constituting a different number of sample signals for each sequence of one picture point from each of the original television lines stored in said first storage means and thereafter reconverting the sample transmission rate to the original sampling rate;

means for storing the filtered and rate-reconverted signals in a second picture field store;

means for reading out signals in said second picture field store in a cross-scanning pattern in which successive picture points are cyclically drawn out of storage from successive sequences of picture points derived from successive sequences of picture points cross-scanned and drawn out from said first picture store to reconstitute television lines control means for controlling the writing-in and reading-out of signals from said first and second picture stores means for filling picture black points in unoccupied cells of said second picture field store, and horizontal formatting means (36) connected in cascade with the foregoing assembly of means and controlled by said control means for subjecting television signals of each television line to low-pass filtering combined with change of sampling rate to produce a different number of picture samples per line and thereafter subjecting said signals to sampling rate reconverting means for restoring the original rate of television signal sample succession, said control means including means for supplying black picture points for unoccupied portions of the resulting television lines and controlling the exclusion of excessive picture points in each television line.

* * * * *